United States Patent
Chang et al.

(10) Patent No.: US 8,717,988 B2
(45) Date of Patent: May 6, 2014

(54) METHOD AND APPARATUS FOR TRANSMITTING AND RECEIVING CONTROL INFORMATION IN A WIRELESS COMMUNICATION SYSTEM

(75) Inventors: Young-Bin Chang, Anyang-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 13/094,169

(22) Filed: Apr. 26, 2011

(65) Prior Publication Data
US 2011/0268057 A1 Nov. 3, 2011

(30) Foreign Application Priority Data
Apr. 30, 2010 (KR) ........................ 10-2010-0041120

(51) Int. Cl.
*H04W 72/04* (2009.01)
*H04W 28/18* (2009.01)
*H04W 56/00* (2009.01)

(52) U.S. Cl.
USPC ............ 370/329; 370/252; 370/254; 455/450

(58) Field of Classification Search
USPC ................ 370/252, 312, 328, 329, 350, 254; 455/450; 714/748
See application file for complete search history.

(56) References Cited

U.S. PATENT DOCUMENTS

| | | | |
|---|---|---|---|
| 7,941,151 B2 * | 5/2011 | Rudolf et al. ................ | 455/450 |
| 8,483,136 B2 * | 7/2013 | Yuk et al. ..................... | 370/328 |
| 8,498,251 B2 * | 7/2013 | Kim et al. .................... | 370/329 |
| 2007/0060167 A1 * | 3/2007 | Damnjanovic et al. ....... | 455/450 |
| 2007/0286066 A1 * | 12/2007 | Zhang et al. ................. | 370/208 |
| 2008/0130537 A1 * | 6/2008 | Kim et al. .................... | 370/310 |
| 2008/0192622 A1 | 8/2008 | Scheim et al. | |
| 2009/0068944 A1 * | 3/2009 | Kang et al. ....................... | 455/8 |
| 2009/0168708 A1 * | 7/2009 | Kumar et al. ................ | 370/329 |
| 2010/0005358 A1 | 1/2010 | Lim et al. | |
| 2010/0185910 A1 * | 7/2010 | Lee et al. ..................... | 714/748 |
| 2011/0007697 A1 * | 1/2011 | Ryu et al. ..................... | 370/329 |
| 2011/0099447 A1 * | 4/2011 | Park et al. .................... | 714/748 |
| 2011/0211510 A1 * | 9/2011 | Kim et al. .................... | 370/311 |

FOREIGN PATENT DOCUMENTS

EP 1679932 A1 7/2006

* cited by examiner

*Primary Examiner* — Ahmed Elallam
(74) *Attorney, Agent, or Firm* — Jefferson IP Law, LLP (57) ABSTRACT

A method and apparatus for transmitting and receiving control information in a wireless communication system are provided. The apparatus includes a DownLink/UpLink (DL/UL) indicator for indicating whether a connection associated with control information to be transmitted is a DL connection or a UL connection and a flow Identification (ID) that identifies the connection are generated and control information including the DL/UL indicator and the flow ID is transmitted to another party to the connection.

24 Claims, 5 Drawing Sheets

METHOD AND APPARATUS FOR TRANSMITTING AND RECEIVING CONTROL INFORMATION IN A WIRELESS COMMUNICATION SYSTEM

PRIORITY

This application claims the benefit under 35 U.S.C. §119 (a) of a Korean patent application filed in the Korean Intellectual Property Office on Apr. 30, 2010 and assigned Serial No. 10-2010-0041120, the entire disclosure of which is hereby incorporated by reference.

BACKGROUND OF THE INVENTION

1. Field of the Invention

The present invention relates to a wireless communication system. More particularly, the present invention relates to a method and apparatus for transmitting and receiving control information using an Identification (ID) that identifies a connection.

2. Description of the Related Art

To satisfy increasing demands for large-capacity data services such as various multimedia Internet services as well as voice services in the wireless communication market, active research has been conducted on new wireless transmission standards, such as Institute of Electrical and Electronics Engineers (IEEE) 802.16e Wireless Broadband (WiBro) or Mobile Worldwide interoperability for Microwave Access (WiMAX), Wireless Local Area Network (WLAN), and $3^{rd}$ Generation Partnership Project Long Term Evolution (3GPP LTE).

In a wireless communication system, data and control messages are exchanged through one or more connections or flows on an uplink directed from a Mobile Station (MS) to a Base Station (BS) and on a downlink directed from the BS to the MS. The uplink and downlink connections are identified by their independent IDs.

Figure 1:
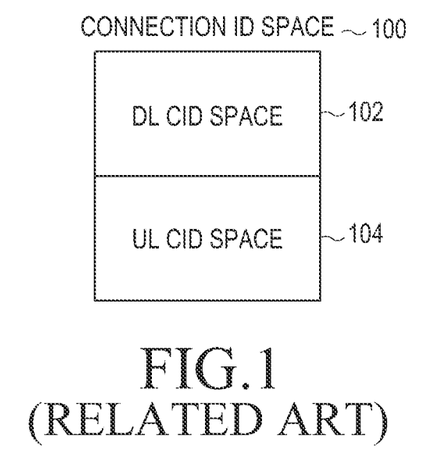
FIG. 1 illustrates Connection Identifications (CIDs) used to identify connections in a Mobile Worldwide interoperability for Microwave Access (WiMAX) system according to the related art.

FIG. 1 illustrates Connection IDs (CIDs) used to identify connections in a Mobile WiMAX system according to the related art.

Referring to FIG. 1, a CID space 100 is divided into a DownLink (DL) CID space 102 and an UpLink (UL) CID space 104. Each of the DL and UL CID spaces 102 and 104 includes predetermined CIDs of 16 bits, for example. Once a DL connection is established, a DL CID is selected from the DL CID space 102 and allocated to the DL connection. Similarly, if a UL connection is established, a UL CID is selected from the UL CID space 104 and allocated to the UL connection. Accordingly, the DL and UL CIDs do not have the same value.

Figure 2:
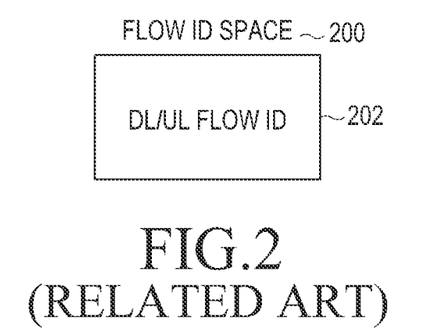
FIG. 2 illustrates flow IDs used to identify connections in an Advanced Mobile WiMAX system according to the related art.

FIG. 2 illustrates flow IDs used to identify connections in an Advanced Mobile WiMAX system according to the related art.

Referring to FIG. 2, a DL or UL flow ID 202 is selected from a whole flow ID space 200. Although flow IDs function like CIDs illustrated in FIG. 1, UL and DL flow IDs may have the same value.

A transmitter and a receiver may support Automatic Repeat reQuest (ARQ) to correct transmission and reception errors in data. An ARQ operation may be performed independently within each connection between the transmitter and receiver. Since packets for each connection are transmitted with a unique CID, the receiver can identify an initial transmission packet and a retransmission packet of the same connection by the CID of the connection and then combine the packets.

The transmitter and receiver may perform an ARQ reset on the uplink or the downlink due to ARQ synchronization loss or other implementation factors. In this case, if one of the transmitter and the receiver performs an ARQ reset, the other party cannot determine whether the ARQ reset is for an uplink or downlink data connection using only a flow ID set in an ARQ reset control message. Similarly, when control information for a connection which should be identified as an uplink or downlink connection is to be transmitted, it is necessary to indicate the link type of the connection.

SUMMARY OF THE INVENTION

Aspects of the present invention are to address at least the above-mentioned problems and/or disadvantages and to provide at least the advantages described below. Accordingly, an aspect of the present invention is to provide a method and apparatus for transmitting and receiving control information using an Identification (ID) that identifies a connection in a wireless communication system.

Another aspect of the present invention is to provide a method and apparatus for transmitting and receiving control information for resetting an Automatic Repeat reQuest (ARQ) operation in a wireless communication system.

A further aspect of the present invention is to provide a method and apparatus for, when control information is transmitted, indicating whether a flow corresponding to the control information is for an uplink or a downlink in a wireless communication system.

In accordance with an aspect of the present invention, a method for transmitting control information in a wireless communication system is provided. The method includes generating a DownLink/UpLink (DL/UL) indicator indicating whether a connection associated with control information to be transmitted is a DL connection or a UL connection and a flow Identification (ID) that identifies the connection, and transmitting control information including the DL/UL indicator and the flow ID to another party to the connection.

In accordance with another aspect of the present invention, a method for receiving control information in a wireless communication system is provided. The method includes receiving control information, decoding from the control information a DL/UL indicator indicating whether a connection associated with the control information is a DL connection or a UL connection and a flow ID that identifies the connection, and determining whether the control information is associated with a DL connection or a UL connection based on the DL/UL indicator and the flow ID.

In accordance with another aspect of the present invention, an apparatus for transmitting control information in a wireless communication system is provided. The apparatus includes a controller for generating a DL/UL indicator indicating whether a connection associated with control information to be transmitted is a DL connection or a UL connection and a flow ID that identifies the connection, and a transmitter for transmitting control information including the DL/UL indicator and the flow ID to another party to the connection.

In accordance with a further aspect of the present invention, an apparatus for receiving control information in a wireless communication system is provided. The apparatus includes a receiver for receiving control information, and a processor for decoding from the control information a DL/UL indicator indicating whether a connection associated with the control information is a DL connection or a UL connection and a flow ID that identifies the connection, and determines whether the control information is associated with a DL connection or a UL connection based on the DL/UL indicator and the flow ID.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While control information transmission and reception operations are described herein in the context of an Institute of Electrical and Electronics Engineers (IEEE) 802.16e/m system as a wireless cellular communication system, it is clearly understood to those skilled in the art that the control information transmission and reception operations of the present invention are not limited to a particular communication protocol or system configuration and that many modifications can be made within the scope and spirit of the present invention.

Figure 3:
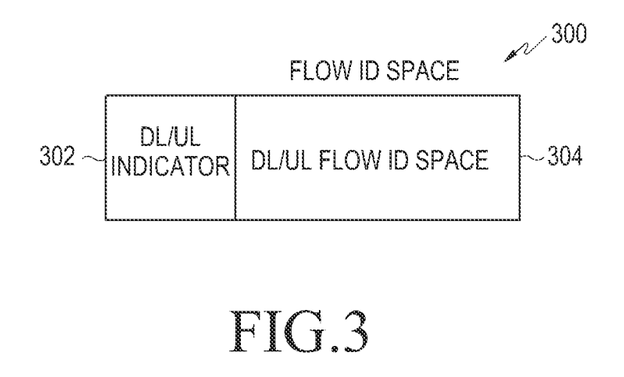
FIG. 3 illustrates uplink and downlink IDs according to an exemplary embodiment of the present invention.

FIG. 3 illustrates UpLink (UL) and DownLink (DL) Identifications (IDs) according to an exemplary embodiment of the present invention.

Referring to FIG. 3, a flow ID space 300 includes a DL/UL indicator 302 and a DL/UL flow ID space 304. A flow ID for a connection is selected from the DL/UL flow ID space 304 and allocated to the connection. For a data and control connection that needs DL or UL identification, the DL/UL indicator 302 is used. The DL/UL indicator 302 may be included in control information to indicate whether the flow ID is for the downlink or the uplink.

Figure 4:
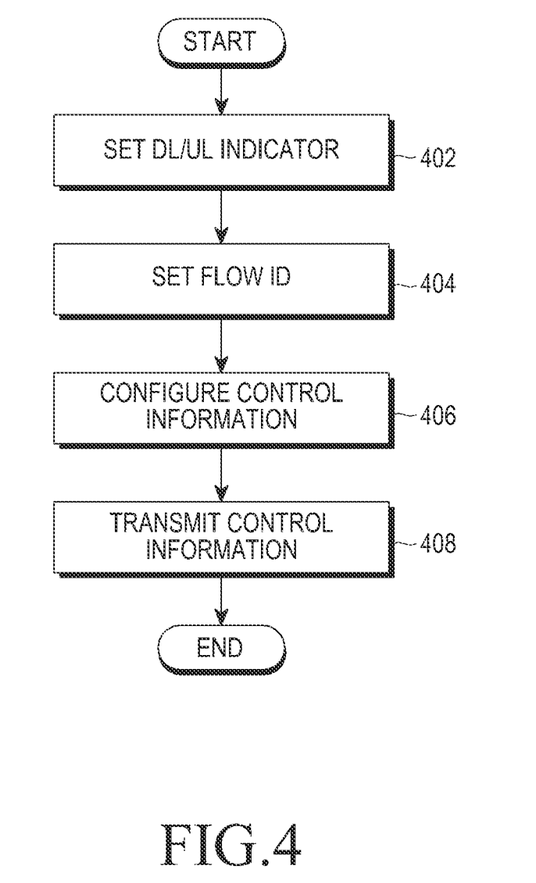
FIG. 4 is a flowchart illustrating an operation for transmitting control information at a transmitter according to an exemplary embodiment of the present invention.

FIG. 4 is a flowchart illustrating an operation for transmitting control information at a transmitter according to an exemplary embodiment of the present invention. The transmitter may be a Mobile Station (MS) on an uplink or a Base Station (BS) on a downlink.

Referring to FIG. 4, when determining to transmit control information requiring identification of a downlink or uplink connection, the transmitter sets a DL/UL indicator indicating a downlink or uplink connection in the control information in step 402. For example, the control information requiring identification of a downlink or uplink connection may be at least one message for controlling an Automatic Repeat reQuest (ARQ) reset, such as an ARQ reset initiation message, an ARQ reset ACKnowledgment (ACK) message, and an ARQ reset confirm message.

The transmitter sets a flow ID in the control information to identify a connection associated with the control information in step 404 and completes configuring the control information in step 406. Configuring the control information involves inserting other specific information together with the DL/UL indicator and the flow ID into the control information and formatting the control information in a predetermined format. The DL/UL indicator may be 1 bit. In step 408, the transmitter transmits the control information to a receiver. The control information may be transmitted in the form of a control message or a control header.

Figure 5:
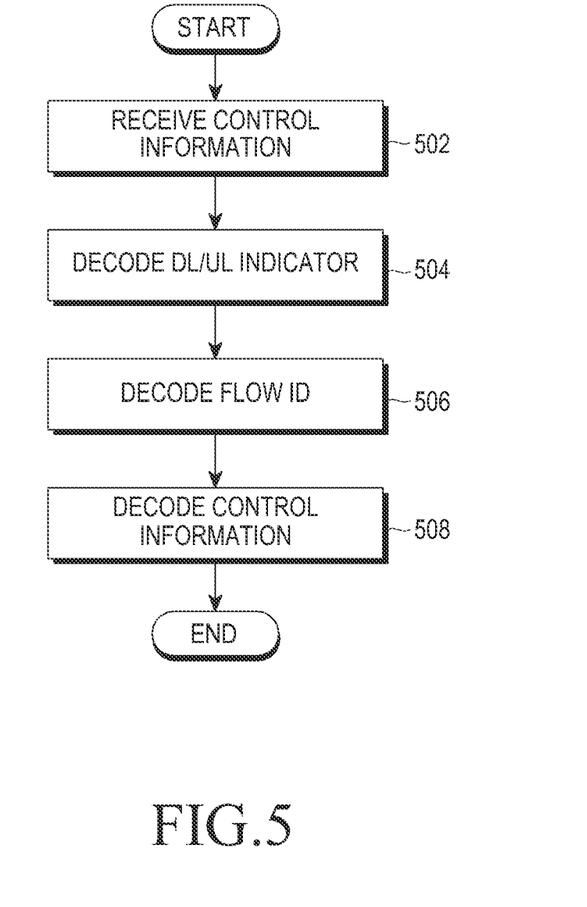
FIG. 5 is a flowchart illustrating an operation for receiving control information at a receiver according to an exemplary embodiment of the present invention.

FIG. 5 is a flowchart illustrating an operation for receiving control information at a receiver according to an exemplary embodiment of the present invention. The receiver may be a BS on an uplink or an MS on a downlink.

Referring to FIG. 5, the receiver receives control information in a control message or a control header from a transmitter in step 502, extracts a DL/UL indicator from the control information, and decodes the DL/UL indicator in step 504. In step 506, the receiver extracts a flow ID from the control information, decodes the flow ID, and determines whether the control information is associated with an uplink or downlink connection. The receiver decodes other specific information included in the control information and performs an operation corresponding to the decoded information in step 508. For example, if the control information is an ARQ reset control message, the receiver resets an ARQ operation for the uplink or downlink connection indicated by the DL/UL indicator and the flow ID.

As described above, when a control message including a flow ID for an uplink data connection and a control message including a flow ID for a downlink data connection are generated simultaneously in the wireless communication system, DL/UL indicators set in the control messages indicate whether the connections are for an uplink or a downlink.

A description of exemplary embodiments of the present invention for initiating an ARQ reset operation using a control message including a DL/UL indicator and a flow ID is provided below. However, exemplary embodiments of the present invention are not limited to this specific message and operation and it is to be clearly understood that the present invention is applicable to transmission of any control information and message requiring identification of an uplink or downlink connection.

Figure 6:
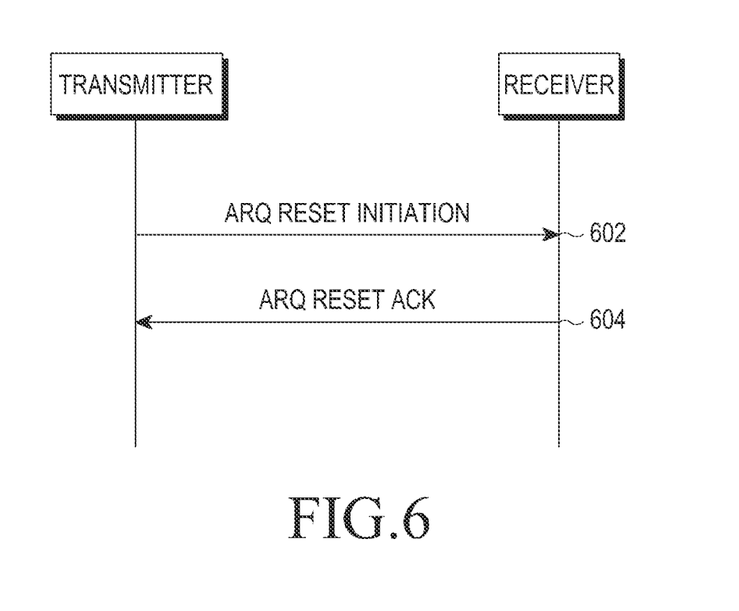
FIG. 6 is a diagram illustrating a message flow for an operation for initiating an Automatic Repeat Request (ARQ) reset at the transmitter according to an exemplary embodiment of the present invention.

FIG. 6 is a diagram illustrating a message flow for an operation for initiating an ARQ reset at the transmitter according to an exemplary embodiment of the present invention.

Referring to FIG. 6, the transmitter sets a DL/UL indicator, a flow ID, and other information related to an ARQ reset in an ARQ reset initiation message and transmits the ARQ reset initiation message to the receiver in order to initiate an ARQ reset in step 602. The DL/UL indicator indicates whether the ARQ reset initiation message is associated with an uplink or downlink data connection.

In step 604, the receiver transmits an ARQ reset ACK message to the transmitter in response to the ARQ reset initiation message. Like the ARQ reset initiation message, the ARQ reset ACK message includes a DL/UL indicator and a flow ID to indicate whether the ARQ reset ACK message is associated with an uplink or downlink data connection. The ARQ reset ACK message includes the same DL/UL indicator and flow ID as those set in the ARQ reset initiation message.

While not shown, the receiver resets an ARQ operation for a data connection indicated by the flow ID among active data connections on a link indicated by the DL/UL indicator. The ARQ operation reset may include initializing a sequence number for the ARQ operation and clearing an ARQ buffer. Similarly, after transmitting the ARQ reset initiation message or receiving the ARQ reset ACK message, the transmitter resets the ARQ operation for the data connection indicated by the DL/UL indicator and the flow ID. Accordingly, the transmitter and the receiver may reset the ARQ operation for the same data connection.

Figure 7:
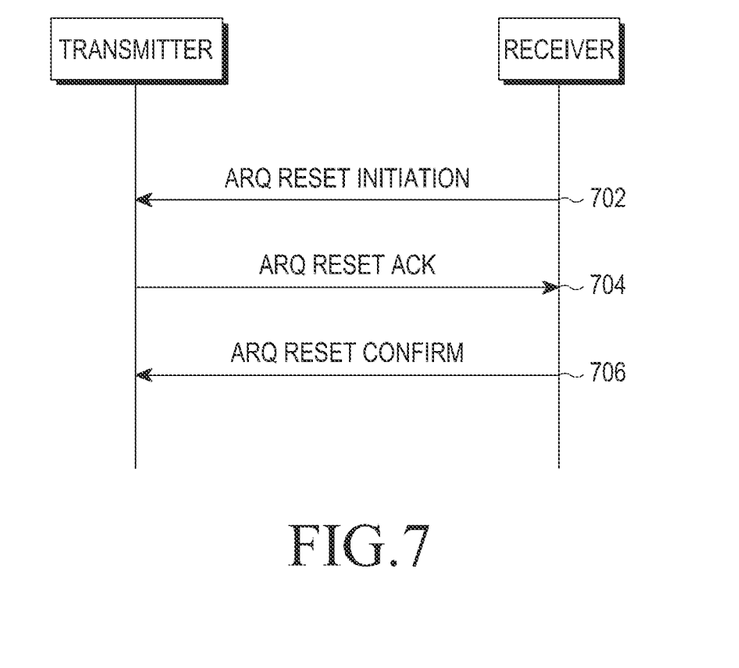
FIG. 7 is a diagram illustrating a message flow for an operation for initiating an ARQ reset at the receiver according to an exemplary embodiment of the present invention.

FIG. 7 is a diagram illustrating a message flow for an operation for initiating an ARQ reset at the receiver according to an exemplary embodiment of the present invention.

Referring to FIG. 7, the receiver sets a DL/UL indicator, a flow ID, and other information related to an ARQ reset in an ARQ reset initiation message and transmits the ARQ reset initiation message to the transmitter in order to initiate the ARQ reset in step 702. The DL/UL indicator indicates whether the ARQ reset initiation message is associated with an uplink or downlink data connection.

In step 704, the transmitter transmits an ARQ reset ACK message to the receiver in response to the ARQ reset initiation message. Like the ARQ reset initiation message, the ARQ reset ACK message includes a DL/UL indicator and a flow ID to indicate whether the ARQ reset ACK message is associated with an uplink or downlink data connection. The ARQ reset ACK message includes the same DL/UL indicator and flow ID as those set in the ARQ reset initiation message received from the receiver.

In step 706, the receiver transmits an ARQ reset confirm message to the transmitter in response to the ARQ reset ACK message. The ARQ reset confirm message includes the same DL/UL indicator and flow ID as those set in the ARQ reset ACK message.

While not shown, after receiving the ARQ reset initiation message or the ARQ reset confirm message or after transmitting the ARQ reset ACK message, the transmitter resets an ARQ operation for a data connection indicated by the flow ID among active data connections on a link indicated by the DL/UL indicator. The ARQ operation reset may include initializing a sequence number for the ARQ operation and clearing an ARQ buffer. Similarly, after transmitting the ARQ reset initiation message or the ARQ reset confirm message or after receiving the ARQ reset ACK message, the receiver resets the ARQ operation for the data connection indicated by the DL/UL indicator and the flow ID. Accordingly, the transmitter and the receiver may reset the ARQ operation for the same data connection.

The ARQ reset control messages, such as the ARQ reset initiation message, the ARQ reset ACK message, and the ARQ reset confirm message may have the following configuration.

Table 1

| Syntax | Size | Note |
| --- | --- | --- |
| ARQ_Reset_Message_Format { | | |
| Message type | 8 | |
| DL/UL indicator | 1 | 0b00 = Downlink |
| | | 0b01 = Uplink |
| Flow ID | 4 | Corresponding connection ID to perform ARQ reset procedure. |
| Type | 2 | 0b00 = Original message from Initiator |
| | | 0b01 = Acknowledgement from Responder |
| | | 0b10 = Confirmation from Initiator |
| | | 0b11 = Reserved |
| Reserved | 1 | Set to zero |
| } | | |

Figure 8:
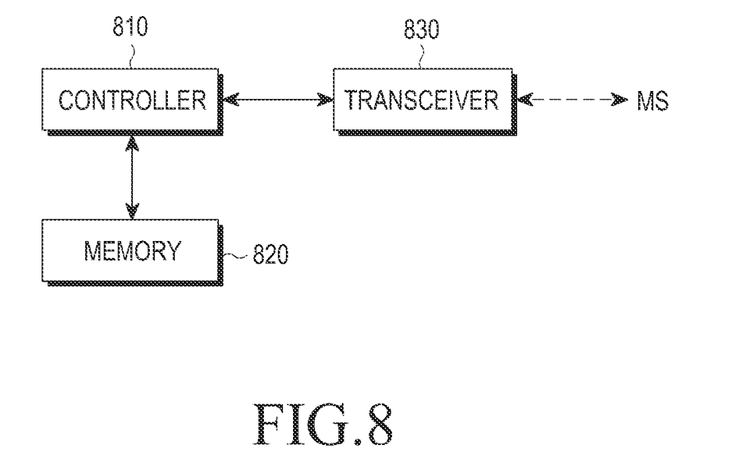
FIG. 8 is a block diagram of a Base Station (BS) according to an exemplary embodiment of the present invention.

FIG. 8 is a block diagram of a BS according to an exemplary embodiment of the present invention.

Referring to FIG. 8, the BS includes a controller 810, a memory 820, and a transceiver 830. The BS may operate as a transmitter for a downlink data connection and as a receiver for an uplink data connection. The controller 810 generates control information or a control message to be transmitted to an MS, transmits the control information or control message to the MS through the transceiver 830, interprets control information or a control message received through the transceiver 830, and performs an operation corresponding to the interpreted control information or control message according to at least one of the afore-described embodiments of the present invention. The memory 820 stores and manages program code and parameters required for operations of the controller 810, for example, the DL/UL indicator and flow ID of each connection, and provides a stored DL/UL indicator and a flow ID upon request of the controller 810. The transceiver 830 exchanges messages with the MS using a transmission scheme and a channel preset between the BS and the MS.

Figure 9:
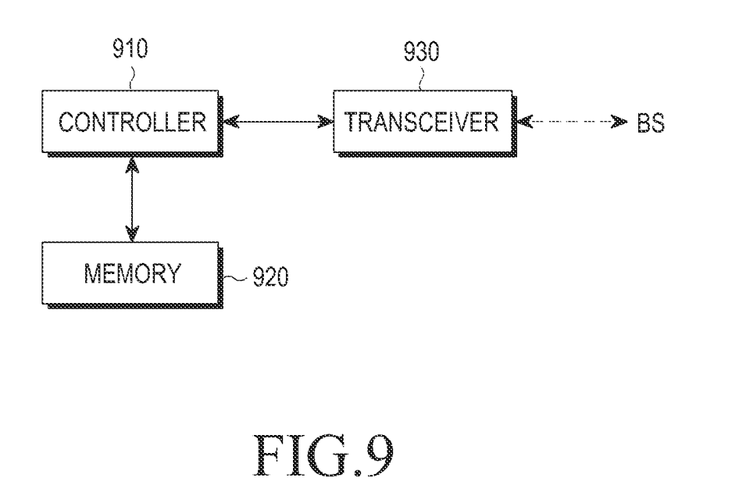
FIG. 9 is a block diagram of a Mobile Station (MS) according to an exemplary embodiment of the present invention.

FIG. 9 is a block diagram of an MS according to an exemplary embodiment of the present invention.

Referring to FIG. 9, the MS includes a controller 910, a memory 920, and a transceiver 930. The MS may operate as a receiver for a downlink data connection and as a transmitter for an uplink data connection. The transceiver 930 receives control information or a control message from a BS and provides the received control information or control message to the controller 910. The transceiver 930 also transmits control information or a control message generated from the controller 910 to the BS. The controller 910 generates control information or a control message, provides the control information or control message to the transceiver 930, interprets control information or a control message received through the transceiver 930, and performs an operation corresponding to the interpreted control information or control message. The memory 920 stores and manages program code and parameters required for operations of the controller 910, for example, the DL/UL indicator and flow ID of each connection, and provides a stored DL/UL indicator and a flow ID upon request of the controller 910.

As is apparent from the above description of the present invention, a DL/UL indicator is inserted into control information to be transmitted to indicate whether the control information is for a downlink or uplink connection. Since a connection for which an operation associated with the control information is to be performed is accurately indicated, a malfunction is prevented and the efficiency and accuracy of signaling are increased.

While the invention has been shown and described with reference to certain exemplary embodiments thereof, it will be understood by those skilled in the art that various changes in form and details may be made without departing from the spirit or scope of the invention as described by the appended claims and their equivalents.

What is claimed is:

1. A method for initiating an Automatic Repeat reQuest (ARQ) reset procedure in a wireless communication system, the method comprising:
generating an ARQ reset message including a DownLink/UpLink (DL/UL) indicator indicating whether a connection to perform the ARQ reset procedure is a DL connection or a UL connection and a flow Identification (ID) that identifies the connection; and
transmitting the ARQ reset message.

2. The method of claim 1, wherein the ARQ reset message includes at least one of a Message type, a Type field, and a Reserved bit.

3. The method of claim 2, wherein the Type field indicates one of an ARQ reset initiation message from an Initiator, an ARQ reset ACKnowledgment (ACK) message from a Responder, an ARQ reset confirm message from the Initiator, and a reserved value.

4. The method of claim 3, wherein the DL/UL indicator is represented as bit information,
wherein if the bit information of the DL/UL indicator is '0b00', the DL/UL indicator represents "the DL connection", and
wherein if the bit information of the DL/UL indicator is '0b01', the DL/UL indicator represents "the UL connection".

5. The method of claim 3, wherein the Type field is represented as bit information,
wherein if the bit information of the Type field is '0b00', the Type field represents the original message,
wherein if the bit information of the Type field is '0b01', the Type field represents the Acknowledgement,
wherein if the bit information of the Type field is '0b10', the Type field represents the confirmation, and
wherein if the bit information of the Type field is '0b11', the Type field represents the reserved value.

6. The method of claim 3, wherein the DL/UL indicator is composed as 1 bit, the flow ID is composed as 4 bits, the type field is composed as 2 bits, and the reserved value is composed as 1 bit that is set to zero.

7. A method for initiating an Automatic Repeat reQuest (ARQ) reset procedure in a wireless communication system, the method comprising:
receiving an ARQ reset message;
decoding from the ARQ reset message a DownLink/UpLink (DL/UL) indicator indicating whether a connection to perform ARQ reset procedure is a DL connection or a UL connection, and a flow Identification (ID) that identifies the connection; and
determining whether the connection is a DL connection or a UL connection based on the DL/UL indicator and the flow ID.

8. The method of claim 7, wherein the ARQ reset message includes at least one of a Message type, a Type field, and a Reserved bit.

9. The method of claim 8, wherein the Type field indicates one of an ARQ reset initiation message from an Initiator, an ARQ reset ACKnowledgment (ACK) message from a Responder, an ARQ reset confirm message from the Initiator, and a reserved value.

10. The method of claim 9, wherein the Type field indicates one of an original message from the Initiator, an ACK from the Responder, an confirmation from the Initiator, and a reserved value.

11. The method of claim 9, wherein the DL/UL indicator is represented as bit information,
wherein if the bit information of the DL/UL indicator is '0b00', the DL/UL indicator represents "the DL connection", and
wherein if the bit information of the DL/UL indicator is '0b01', the DL/UL indicator represents "the UL connection".

12. The method of claim 9, wherein the Type field is represented as bit information,
wherein if the bit information of the Type field is '0b00', the Type field represents the original message,
wherein if the bit information of the Type field is '0b01', the Type field represents the Acknowledgement,
wherein if the bit information of the Type field is '0b10', the Type field represents the confirmation, and
wherein if the bit information of the Type field is '0b11', the Type field represents the reserved value.

13. An apparatus for initiating Automatic Repeat reQuest (ARQ) reset procedure in a wireless communication system, the apparatus comprising:
a controller for generating an ARQ reset message including a DownLink/UpLink (DL/UL) indicator indicating whether a connection to perform the ARQ reset procedure is a DL connection or a UL connection and a flow Identification (ID) that identifies the connection; and
a transmitter for transmitting the ARQ reset message.

14. The apparatus of claim 13, wherein the ARQ reset message includes at least one of a Message type, a Type field, and a Reserved bit.

15. The apparatus of claim 14, wherein the Type field indicates one of an Automatic Repeat reQuest (ARQ) reset initiation message from an Initiator, an ARQ reset ACKnowledgment (ACK) message from a Responder, an ARQ reset confirm message from the Initiator, and a reserved value.

16. The apparatus of claim 15, wherein the DL/UL indicator is represented as bit information,
wherein if the bit information of the DL/UL indicator is '0b00', the DL/UL indicator represents "the DL connection", and
wherein if the bit information of the DL/UL indicator is '0b01', the DL/UL indicator represents "the UL connection".

17. The apparatus of claim 15, wherein the Type field is represented as bit information,
wherein if the bit information of the Type field is '0b00', the Type field represents the original message,
wherein if the bit information of the Type field is '0b01', the Type field represents the Acknowledgement,
wherein if the bit information of the Type field is '0b10', the Type field represents the confirmation, and
wherein if the bit information of the Type field is '0b11', the Type field represents the reserved value.

18. The apparatus of claim 15, wherein the DL/UL indicator is composed as 1 bit, the flow ID is composed as 4 bits, the type field is composed as 2 bits, and the reserved value is composed as 1 bit that is set to zero.

19. An apparatus for initiating an Automatic Repeat reQuest (ARQ) reset procedure in a wireless communication system, the apparatus comprising:
a receiver for receiving an ARQ reset message;
a decoder for decoding from the ARQ reset message a DownLink/UpLink (DL/UL) indicator indicating whether a connection to perform ARQ reset procedure is a DL connection or a UL connection, and a flow Identification (ID) that identifies the connection, and for determining whether the connection is a DL connection or a UL connection based on the DL/UL indicator and the flow ID.

20. The apparatus of claim 19, wherein the ARQ reset message includes at least one of a Message type, a Type field, and a Reserved bit.

21. The apparatus of claim 20, wherein the Type field indicates one of an Automatic Repeat reQuest (ARQ) reset initiation message from an Initiator, an ARQ reset ACKnowledgment (ACK) message from a Responder, an ARQ reset confirm message from the Initiator, and a reserved value.

22. The apparatus of claim 20, the Type field indicates one of an original message from the Initiator, an ACK from the Responder, a confirmation from the Initiator, and a reserved value.

23. The apparatus of claim 20, wherein the DL/UL indicator is represented as bit information,
wherein if the bit information of the DL/UL indicator is '0b00', the DL/UL indicator represents "the DL connection", and
wherein if the bit information of the DL/UL indicator is '0b01', the DL/UL indicator represents "the UL connection".

24. The apparatus of claim 20, wherein the Type field is represented as bit information,
wherein if the bit information of the Type field is '0b00', the Type field represents the original message,
wherein if the bit information of the Type field is '0b01', the Type field represents the Acknowledgement,
wherein if the bit information of the Type field is '0b10', the Type field represents the confirmation, and
wherein if the bit information of the Type field is '0b11', the Type field represents the reserved value.

* * * * *